United States Patent
Do Rosário et al.

(10) Patent No.: US 12,292,153 B2
(45) Date of Patent: May 6, 2025

(54) PIPE REPAIR AND THE METHODS FOR OPERATIONAL FIXING AND DEFINITIVE WELDING THEREOF

(71) Applicants: ENDSERV INSPECÃO DE EQUIPAMENTOS E MATERIAIS LTDA ME, Serra (BR); PETRÓLEO BRASILEIRO S.A.—PETROBRAS, Rio de Janeiro (BR)

(72) Inventors: Fabio Correia Do Rosário, Serra (BR); Tatyana Soriano De Oliveira, Serra (BR)

(73) Assignees: ENDSERV INSPECÃO DE EQUIPAMENTOS E MATERIAIS LTDA, Serra (BR); PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 28 days.

(21) Appl. No.: 17/278,784

(22) PCT Filed: Sep. 11, 2019

(86) PCT No.: PCT/BR2019/050389
§ 371 (c)(1),
(2) Date: Mar. 23, 2021

(87) PCT Pub. No.: WO2020/061664
PCT Pub. Date: Apr. 2, 2020

(65) Prior Publication Data
US 2022/0034441 A1    Feb. 3, 2022

(30) Foreign Application Priority Data
Sep. 24, 2018    (BR) .......................... 1020180694480

(51) Int. Cl.
*F16L 55/17*    (2006.01)
*B23K 37/053*    (2006.01)
(Continued)

(52) U.S. Cl.
CPC ............ *F16L 55/17* (2013.01); *B23K 37/053* (2013.01); *F16L 55/1683* (2013.01);
(Continued)

(58) Field of Classification Search
CPC ... F16L 13/02; F16L 13/0218; F16L 13/0236; F16L 55/168; F16L 55/1683;
(Continued)

(56) References Cited

U.S. PATENT DOCUMENTS 397,262 A * 2/1889 Williams .............. B65B 13/025
100/32
1,398,298 A * 11/1921 Irvin ........................ B65D 7/30
220/4.07

(Continued)

FOREIGN PATENT DOCUMENTS

CN    108942075 A * 12/2018    ......... B23K 37/0533

OTHER PUBLICATIONS

Bruce, William A. and John Kiefner. Pipeline Repair Using Full-Encirclement Repair Sleeves. Oil and Gas Pipelines: Integrity and Safety Handbook, 2015, pp. 635-655, [retrieved on Sep. 14, 2022]. Retrieved from Knovel via <URL:https://app.knovel.com/hotlink/pdf/id:kt011UJ7H1/oil-gas-pipelines-integrity> (Year: 2015).*

*Primary Examiner* — Robert K Arundale
*Assistant Examiner* — Richard K. Durden
(74) *Attorney, Agent, or Firm* — B. Aaron Schulman, Esq.; Stites & Harbison, PLLC

(57) ABSTRACT

The present invention relates to the repair of pipes, comprising a two-part ring fixed initially by a compression unit which allows the execution of longitudinal welding in order
(Continued)

definitively to fix the two-part ring, via apertures, before the compression unit is removed. The two-part ring will be completely welded to the pipe, especially in regions close to connections, but it is necessary for the two-part ring to be fixed initially by the compression unit for the purpose of shaping and definitive geometry of the ring relative to the pipe, normalization of fluid conveyance and in order that it is possible for welding to be planned for the opportune moment.

8 Claims, 3 Drawing Sheets

(51) Int. Cl.
| | |
|---|---|
| *F16L 55/168* | (2006.01) |
| *F16L 55/172* | (2006.01) |
| *F16L 55/178* | (2006.01) |
| *F16L 55/18* | (2006.01) |
| *B23K 9/035* | (2006.01) |
| *B23K 37/0533* | (2025.01) |
| *B23K 37/0535* | (2025.01) |

(52) U.S. Cl.
CPC ............. *F16L 55/172* (2013.01); *F16L 55/18* (2013.01); *B23K 9/0358* (2013.01); *B23K 37/0533* (2013.01); *B23K 37/0535* (2013.01); *F16L 55/178* (2013.01)

(58) Field of Classification Search
CPC ..... F16L 55/17; F16L 55/172; F16L 55/1725; F16L 55/175; F16L 55/178
USPC ........................................ 24/280; 138/97, 99
See application file for complete search history.

(56) References Cited

U.S. PATENT DOCUMENTS

| | | | | | |
|---|---|---|---|---|---|
| 1,967,466 | A | * | 7/1934 | Damsel | F16L 17/04 285/373 |
| 2,259,023 | A | * | 10/1941 | Clark | E21B 17/1085 29/898.059 |
| 2,674,966 | A | * | 4/1954 | Morris | B23K 37/0533 29/222 |
| 2,893,758 | A | * | 7/1959 | Dufour | F16L 13/0236 285/294.1 |
| 2,896,978 | A | * | 7/1959 | Schumacher | F16L 23/08 403/338 |
| 4,747,430 | A | * | 5/1988 | Stata | F16L 55/18 29/402.09 |
| 5,012,842 | A | * | 5/1991 | Savard | F16L 55/17 24/68 CT |
| 5,123,451 | A | * | 6/1992 | Savard | F16L 55/17 264/36.16 |
| 5,361,972 | A | * | 11/1994 | Barker | B23K 9/32 228/49.3 |
| 5,738,386 | A | * | 4/1998 | Barefoot | B23K 37/0533 285/23 |
| 6,039,235 | A | * | 3/2000 | Prissadachky | B23K 37/0533 228/44.5 |
| 7,017,253 | B1 | * | 3/2006 | Riggle | B25B 1/103 29/256 |
| 8,266,776 | B2 | * | 9/2012 | Dwileski, Jr. | B23K 37/0533 29/272 |
| 9,446,473 | B2 | * | 9/2016 | Hasegawa | B21C 37/08 |
| 2006/0220375 | A1 | * | 10/2006 | Tisch | F16L 55/17 285/15 |
| 2012/0012559 | A1 | * | 1/2012 | Fisher | B23K 9/186 219/73.2 |
| 2018/0274710 | A1 | * | 9/2018 | Strother | F16L 55/1683 |
| 2018/0281117 | A1 | * | 10/2018 | Wood | B23K 33/006 |

* cited by examiner

PIPE REPAIR AND THE METHODS FOR OPERATIONAL FIXING AND DEFINITIVE WELDING THEREOF

This application is a national stage application under 35 U.S.C. § 371 of International Application No. PCT/BR2019/050389, filed Sep. 11, 2019, which claims priority to BR 1020180694480, filed Sep. 24, 2018, the disclosures of which are explicitly incorporated herein in their entireties by reference.

TECHNICAL FIELD

The invention relates to a device to close off the leakage and/or to reinforce the pipe by means of a split sleeve with a compressed sealant material against the outer surface of the pipe. The use of clamp coupling will allow the attachment of the device to the pipe while in operation and properly prepare for the weld, which may occur while in operation, depending on the fluid carried in the pipeline.

BACKGROUND

The device described in the present invention is used to repair pipes, especially in the ones near to connections or fittings. The device is also used to prevent damage caused by the appearance of pits and/or cracks that result in leakage of the fluid conducted in the pipe. Additionally, the device is used to recover the mechanical strength of the pipe, which is usually reduced by corrosion, erosion or accidental deformation. Recovering the mechanical strength of the pipe will prevent an unscheduled plant shutdown or reduction of the flow in the transport of fluids. Therefore, the use of the device will avoid the economic and environmental hazards arising from the leak.

Numerous techniques for closing off the leakage or recovering the mechanical strength of the pipes are available in prior art and can be selected according to the environment where the pipe is, the material in which the pipe is made and the constraints of time and space to the repairment. For a general understanding of the prior art, the techniques with features and methods similar to the present invention are described in the following paragraphs.

The technique, applicable also in cases when the pipe is out of operation, consists of welding the parts of the split sleeve or sleeves, forming a second layer in the damaged region.

As shutting down the operation is cost-consuming, the proposed technique incorporates a compression unit in the system, that allows the sleeves to be held united. In this way, a definitive welding can be carried out later, with the pipeline out of operation. Also, the method would be useful when the material carried in the pipeline allows a programmed welding in the tube while in operation. The documents U.S. Pat. No. 7,066,210B2, BR102013024532-1 and U.S. Pat. No. 9,982,829B2 filed respectively in 15 Jul. 2003, 25 Sep. 2013 and 17 Mar. 2016, illustrate some improvements in the structure of sleeves and in the compression unit.

The documents U.S. Pat. No. 7,066,210B2 and U.S. Pat. No. 9,982,829B2 disclose the use of a filling material or adhesive between pipes and sleeves.

When compared to the present invention, the documents in the prior art, even though revealing techniques to close off leaks or recover the mechanical strength of the pipe, are not recommended for several situations because of the proximity of the connections and the dimensions involved. Also, the technique presented in this document allows the user to choose the most efficient sealant material in tightness, with properties that do not deform even after welding.

The documents in prior art do not disclose the use of a filler material for welding between the pipes and sleeves, so that the sleeves are completely welded to either the pipe or the connection. Furthermore, the documents describe that the welding among the sleeves must occur prior to the removal of the compression unit. However, the welding is only possible because the length of the sleeves is greater than the width of the chain, or set of chains, of the compression unit that embrace the sleeves.

Technical Solution

The claimed invention has its technical basis in the structural features of the split sleeve that allow its fixation close to the connections and apertures created in the compression unit. These intrinsic characteristics will allow carrying out the welding in the joints of the sleeves as standards ASME PCC-2 2015-"Repair of pressure equipment and piping" and API1104 21st edition "Standard for Welding Pipelines and Related Facilities".

The structural features, i.e. width, thickness, way of overlapping the parts of the sleeves, and the internal space for accommodating the sealant, associated with the method of welding the sleeves, will allow the choice of a sealant material that is chemically compatible with the pipe material, preventing galvanic or crevice corrosion.

Advantages

The advantages of the disclosed invention are revealed in basis of its constructive characteristics, wherein the diameter and width ratio of the split sleeve makes the split sleeve to be identified as a split ring (1). These advantageous features are related to the repair method which uses the technique of compression of split sleeves on the surface either with a leakage or requiring mechanical reinforcement.

The split ring (1) is completely welded to the pipe, particularly in the regions near to the connections. However, it is necessary that the split ring be initially attached by the compression unit (9) for conformance and definitive surface geometry of the ring to the pipe, normalization of the transport of fluids and so that welding can be planned to an opportune moment. To meet the requirements in the standards, which request that the start of the welding be longitudinal, it is necessary that the initiation of the welding for repairment be in the fitting region (15) of the split ring parts, therefore prior to the removal of the compression unit (9). The compression unit (9) is designed with apertures (10) that allow the longitudinal welding (16), in the fitting region (15) of the split ring (1) parts, with the compression unit (9) installed and by exerting the compression of the split ring (1) on the pipe or connection.

The regions near to the pipe connections usually have different roughness when compared to the pipe per se, due to welds either between the connections and the tube, or between tubes. To remedy and close off the leak in these regions, it is necessary that the contact of the ring with the pipe be through a sealant for better accommodation of the surface of the ring to the pipe. The disclosed split ring (1) is designed with a channel (6) to accommodating the sealant (8) preventing future crevice corrosion. The split ring also provides tightness right after its application.

An advantage of the disclosed split ring (1) and the method of welding the split ring (1) to the pipe is the possibility of choosing the sealant (8) material to the best accommodation of the split ring (1) to the pipe, without damages in the sealant (8) caused by the increase in the temperature, characteristic of the welding process.

Another advantage arises from the fact that the thicknesses of the split ring (1), especially in the fitting region (15) of the ring parts, have been calculated so that damages caused by corrosion or heating do not occur. The split ring (1) excludes the damage caused by the oxidation of the split ring materials and the pipe, as well as in the connections, even when the heating associated to the welding process is considered. Due to the shape of the split ring's fitting region (15), there is no need of a backing strip or back plate installation. So, the overlapping of split ring's parts in the fitting region (15) allows a weld which does not penetrate the region and, at the same time, form a longitudinal weld between the split ring (1) and the pipe.

Additional advantage of the disclosed invention arises from the suitability of the split ring (1)'s full width to the curves, reductions and flanges in the pipelines. The split sleeves, also known as double troughs or full encirclement sleeve, available in the prior art have larger dimensions.

The improvements introduced by the disclosed invention in pipe repairment and the methods of fixing pipes while in operation, as well as the definitive welding for the provisional repair will be better understood and clarified with the detailed description and the drawings presented in this document.

DESCRIPTION OF DRAWINGS

The disclosed invention will be described with reference to the accompanying drawings, which show important sample embodiments of the invention and which are incorporated in the specification. A more complete understanding of the invention may be had by reference to the detailed description when taken in conjunction with the accompanying drawings, wherein.

DETAILED DESCRIPTION

Figure 1:
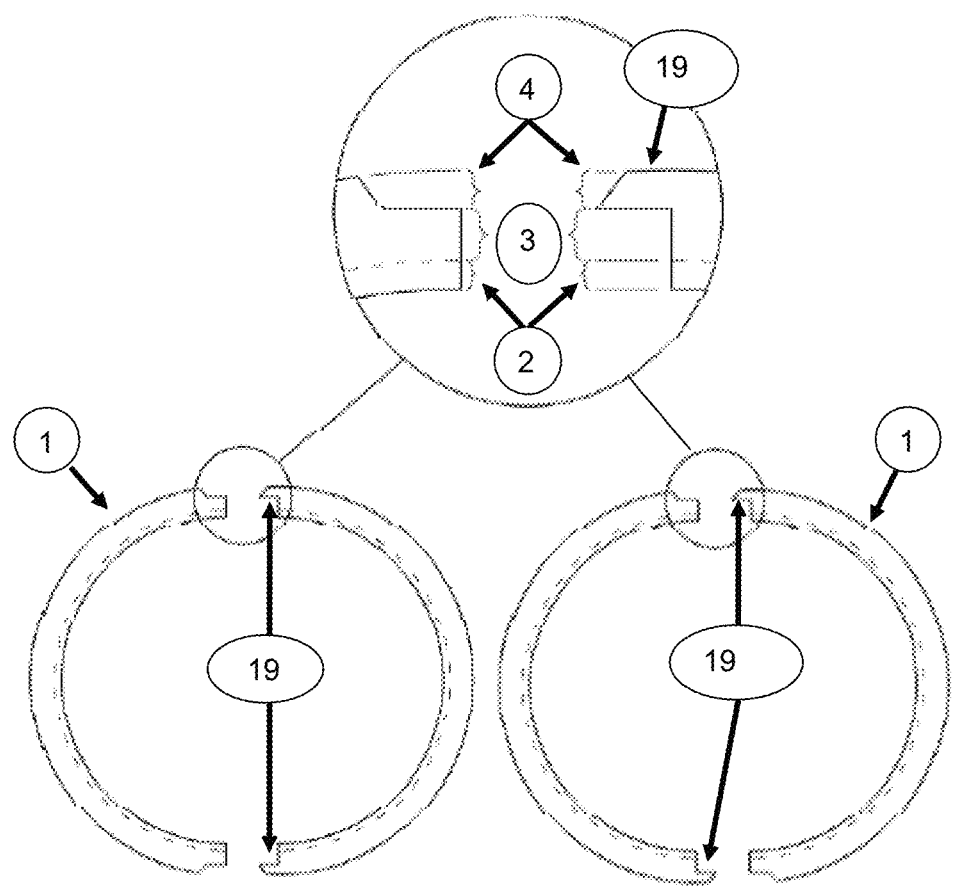
FIG. 1 is a transverse cross section of the fitting region (15) of the parts of the split ring (1) in the pipe repair system.

One or more exemplary embodiments of the present invention will be described below. In an effort to provide a concise description of these embodiments, not all features of an actual implementation are described in the specification. The present invention discloses a system for repairment of pipes as well as methods of fixing the pipes using such system while in operation and a later definitive welding of the repair in an opportune moment. The invention comprises a split ring (1) with total thickness corresponding to the sum of the thickness of the channel (2) of accommodation of the sealant (8), plus the thickness of the backing strip (3), which is equivalent to the back plate, and plus the thickness for the welding (4). The thickness for the welding (4) must be greater than or equal to the thickness of the pipe to be repaired, as shown in the FIG. 1.

FIG. 1 also shows the two possible embodiments of machining or casting the ends of the split ring parts (1). For these embodiments, the extension (19) with the thickness for the welding (4) can be either in the two ends of a single part as in the left side ring, or at one of the ends of the two parts as in the right side ring.

Figure 2:
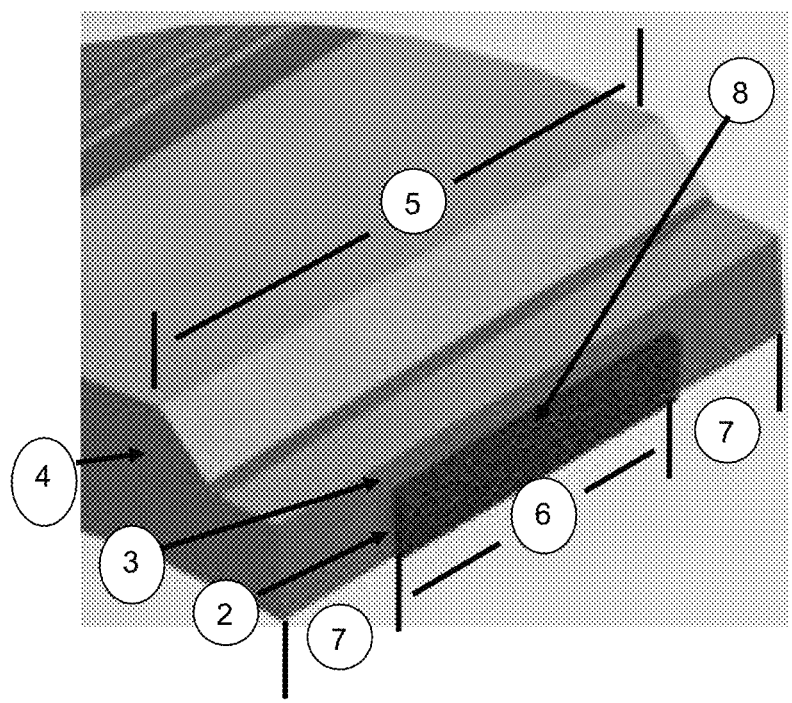
FIG. 2 is an enlarged perspective view of one of split ring (1)' end.

The total width (5) of the split ring (1) corresponds to the sum of the width of the channel (6) and the two lateral widths (7) for heat dissipation during the welding. The minimum total width is 20 millimeters, allowing the generation of the channel for the sealant (8) inside the split ring (1), as shown in FIG. 2.

The thickness of the back (3), the total width (5) of the sealant accommodation channel (2) and the widths of the lateral widths (7) for heat dissipation while welding are calculated as a function of the sealant (8) chosen and the thermal input of the welding process. The thickness of the back plus the thickness of the sealant accommodation channel, which together equal the thickness of the lateral widths, is also at least equal to the thickness of the pipe wall, or some equivalent.

The initial correction of the repair is made without welding, i.e., using a compression unit (9) that will attach the parts of the split ring to the pipe surface or connection, allowing a later weld to be carried out in the opportune moment.

Figure 3:
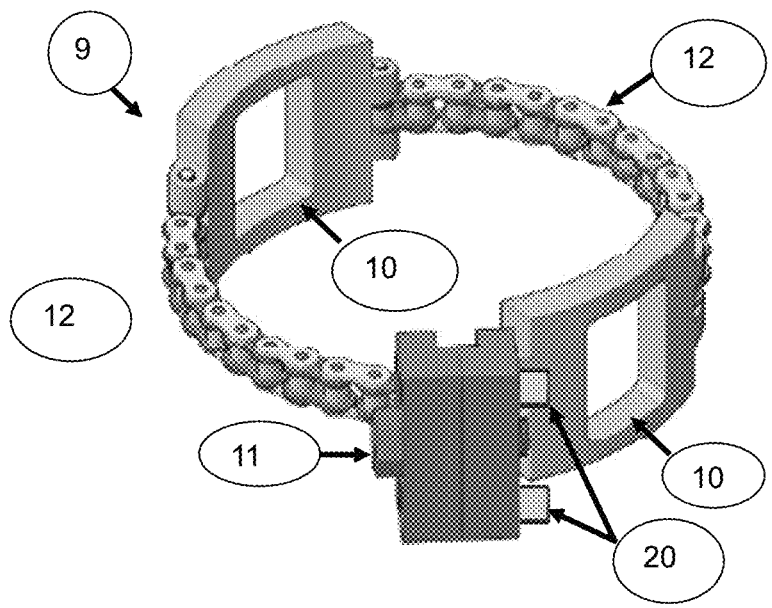
FIG. 3 is a perspective view of the compression unit (9).

FIG. 3 presents the compression unit (9) with two hollow rectangular pieces, forming apertures (10). The apertures allow accessibility of the welding area of the split ring (1)'s parts to the welding with the unit, exerting the compression on the split ring (1) to keep it fixed to the pipe or connection. FIG. 3 shows also that the compression is done by a connector as a single screw (11) that will get the chains (12) near to the compression unit (9), with the aid of guide pins (20) so that the compressive force exerted by the screw (11) is only in the direction of the tightening, preventing the screw (11) from damages.

The compression of the split ring (1) on the pipe or connection will stop the leakage by the contact of the sealant (8) with the surface of the pipe or connection. The split ring (1) assembly and compression unit (9) will act as reinforcement of the mechanical resistance of the pipe in the site of damage, preventing crack propagation or crevice corrosion and pipe rupture.

The sealant (8) must be chosen for its capability to adapt to the pipe surface's irregularities. The sealant (8) is selected among composites, polymers and gaskets, as, for example, but not limited to, Graphite Gasket.

Figure 4:
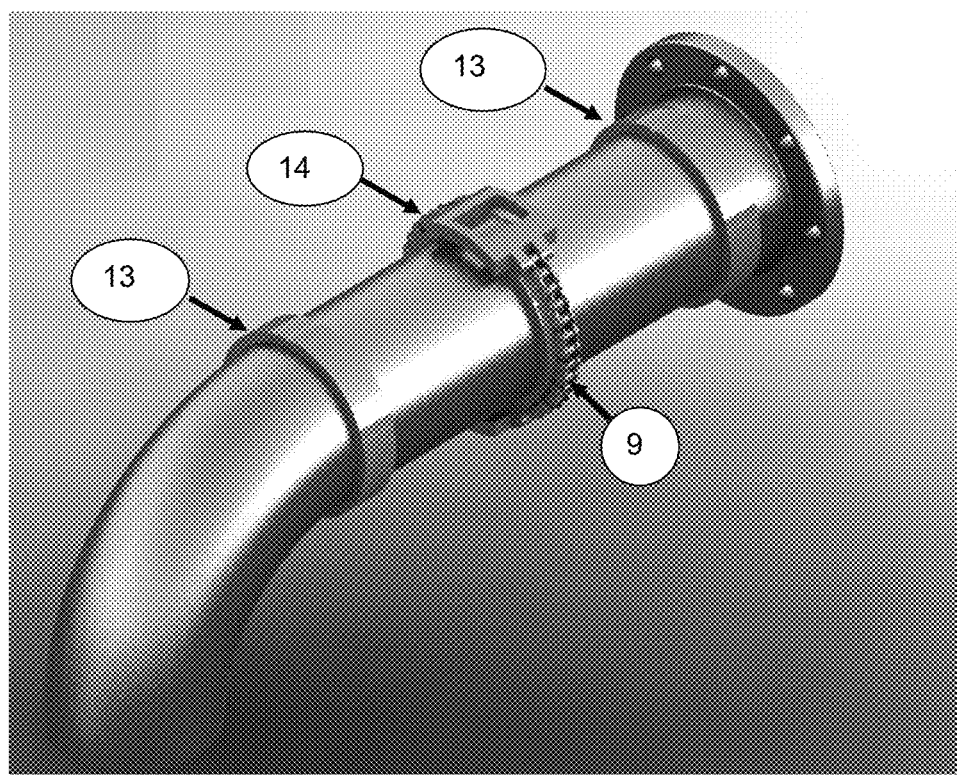
FIG. 4 is a perspective view of compressed split rings (14) or welded (13) in a pipe and connections.

FIG. 4 illustrates the situation when the split ring can receive a definite welding (13). In this scenario, the split ring becomes definite part of pipeline or is provisionally fixed (14), using the compression unit (9).

Figure 5:
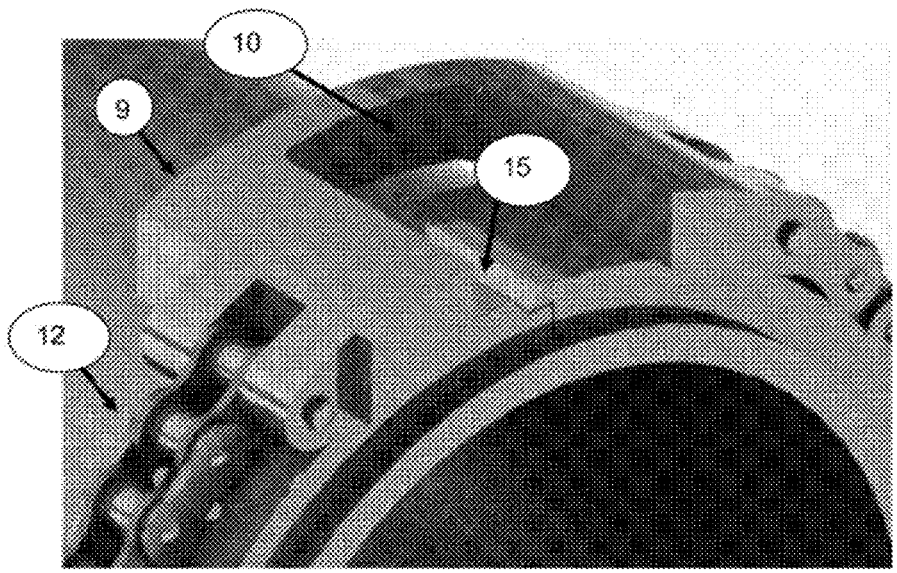
FIG. 5 is an enlarged perspective view of the split ring's welding or fitting region (15) and its details.
Figure 6:
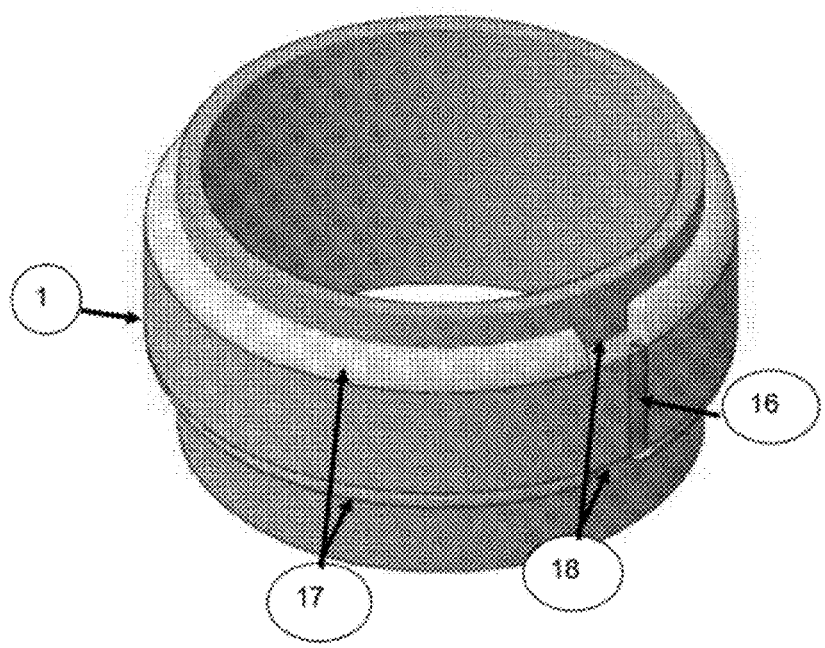
FIG. 6 is an enlarged perspective view of welding longitudinal (16) and circumferential (17) of the split ring (1).

FIG. 5 shows in detail the fitting region (15) of the parts of the split ring (1) in condition to be filled with a filler material for welding, through the apertures (10), before the compression unit (9) is removed.

Once joined to the parts of the split ring (1), carrying out the longitudinal welding (16), the welding can be made along the circumference of the pipe or connection. The circumferential welding (17) can start with the compression unit (9), which must be removed only for the completion of the circumferential welding (17) in the region of the hollow rectangular parts (18), as shown in FIG. 5.

Welding with heat input control prevents high temperatures in the welding process. The uncontrolled rise of temperatures during the welding can damage the seal and the pipe, already weakened by flaws.

The present invention has been described by its features understood as more expressive. However, certain variations and modifications will become apparent to one skilled in the art after the present description. Such variations and modifications are not in any way limiting and are included in the scope of the present invention.

The invention claimed is:

1. A system for repairing or reinforcing a pipe wall, said system comprising:

a split ring and a compression unit;

the split ring comprising two circumferentially extending split ring parts configured to be joined together at two fitting regions, the split ring parts configured such that, in each fitting region, a first circumferential end of one of the split ring parts is configured to be welded to a second circumferential end of the other split ring part in order to form a complete ring about an outer surface of the pipe wall;

the split ring comprising a circumferentially extending sealant accommodation channel along a radially inner side of the split ring whereby a sealant disposed within said sealant accommodation channel is configured to form a seal between the split ring and the outer surface of the pipe wall;

wherein at each fitting region, the first circumferential end comprises an integral backing strip positioned radially outward of an end portion of the sealant accommodation channel, the backing strip having a reduced outer diameter relative to a nominal outer diameter of the split ring, wherein a first tapered edge provides a transition from the reduced outer diameter of the backing strip to the nominal outer diameter of the split ring in a direction away from the first circumferential end, and the second circumferential end comprises an extension having a second tapered edge providing a transition from a reduced outer diameter substantially corresponding to the reduced outer diameter of the backing strip of the first circumferential end to the nominal outer diameter of the split ring in a direction away from the second circumferential end, the extension circumferentially extending from the respective split ring part so as to form a radially inner recess configured to accept the backing strip and the end portion of the sealant accommodation channel of the first circumferential end;

wherein the first tapered edge and second tapered edge form a V-shaped welding channel therebetween configured to accommodate a weld bead to join the first circumferential end and second circumferential end, wherein the backing strip is positioned radially between the welding channel and the sealant accommodation channel to protect the sealant within the channel during welding;

wherein a combined radial thickness of the end portion of the sealant accommodation channel and backing strip of the first circumferential end plus a radial thickness of the extension of the second circumferential end is equal to a total thickness of the split ring, said total thickness of the split ring being greater than or equal to a nominal thickness of the pipe wall;

wherein the split ring further comprises two lateral widths defining sides of the sealant accommodation channel, wherein a combined width of the sealant accommodation channel and the two lateral widths is equal to a total width of the split ring;

the compression unit comprising a connector and two rectangular pieces, wherein the connector and the two rectangular pieces are interconnected by chains; the compression unit configured such that each rectangular piece is positionable over a respective one of the two fitting regions of the split ring, wherein each rectangular piece comprises an aperture to enable the respective weld bead to be deposited in the respective welding channel while the compression unit compresses the split ring and the sealant against the outer surface of the pipe wall;

wherein the connector of the compression unit comprises two connector parts, a screw, and two guide pins, wherein the screw is configured to adjust a distance between the two connector parts, whereby drawing the connector parts together via the screw tightens the compression unit about the split ring and pipe;

wherein the two guide pins are arranged parallel to a longitudinal axis of the screw and configured to guide the two connector parts such the relative movement between the two connector parts is restricted to movement parallel to the longitudinal axis of the screw, preventing damage to the screw from transverse bending as the compression unit is tightened.

2. The system according to claim 1, wherein a first of the two split ring parts provides the first circumferential ends for both of the fitting regions, and a second of the two split ring parts provides the second circumferential ends for both of the fitting regions.

3. The system according to claim 1, wherein a first of the two split ring parts provides the first circumferential end for a first of the two fitting regions and the second circumferential end for a second of the two fitting regions, and a second of the two split ring parts provides the second circumferential end for the first of the two fitting regions and the first circumferential end for the second of the two fitting regions.

4. The system according to claim 1, wherein the sealant is a gasket formed from a material selected from the group consisting of composites, polymers, and graphite.

5. The system according to claim 1 wherein the total width of the split ring is at least 20 millimeters.

6. A method of repairing or reinforcing a pipe wall of a pipeline in operation using the system of claim 1, the method comprising:

a) providing the system of claim 1;

b) arranging the split ring around an outer surface of the pipe wall such that the sealant in the sealant accommodation channel is disposed on the outer surface of the pipe wall;

c) installing the compression unit around the split ring and compressing the split ring and sealant against the outer surface of the pipe wall, whereby each of the rectangular pieces of the compression unit is positioned over a respective fitting region of the split ring, the aperture of each rectangular piece providing access to the respective welding channel;

d) welding the split ring parts together by depositing a weld bead in the welding channel formed at each fitting region;

e) partially welding longitudinal ends of the split ring to the pipe wall via circumferential welds in regions which are accessible while the compression unit remains installed around the split ring;

f) removing the compression unit; and g) completing circumferential welding of the longitudinal ends of the split ring to the pipe wall.

7. The method according to claim 6, wherein the sealant is a gasket formed from a material selected from the group consisting of composites, polymers, and graphite.

8. The method according to claim 6, wherein the partial welding of the longitudinal ends of the split ring to the pipe wall as defined in step e) uses heat input control.

\* \* \* \* \*